(12) United States Patent
Ganguly et al.

(10) Patent No.: US 7,483,907 B2
(45) Date of Patent: *Jan. 27, 2009

(54) PROCESSING DATA-STREAM JOIN AGGREGATES USING SKIMMED SKETCHES

(75) Inventors: Sumit Ganguly, Bhopal (IN); Minos Garofalakis, Morristown, NJ (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/025,578

(22) Filed: Dec. 29, 2004

(65) Prior Publication Data

US 2006/0143170 A1    Jun. 29, 2006

(51) Int. Cl.
*G06F 17/30* (2006.01)
(52) U.S. Cl. .............................. 707/101; 707/2; 707/6; 707/100
(58) Field of Classification Search .................... 707/2, 707/100, 6, 101
See application file for complete search history.

(56) References Cited

U.S. PATENT DOCUMENTS 5,991,754 A * 11/1999 Raitto et al. ................... 707/2
6,516,310 B2 * 2/2003 Paulley ........................... 707/2
7,020,649 B2 * 3/2006 Cochrane et al. ............... 707/3
7,184,998 B2 * 2/2007 Nica ............................. 707/2

OTHER PUBLICATIONS

U.S. Appl. No. 10/954,901, filed Sep. 30, 2004, Sumit Ganguly et al.
U.S. Appl. No. 11/025,211, filed Dec. 29, 2004, Alin Dobra et al.
U.S. Appl. No. 11/025,355, filed Dec. 29, 2004, Sumit Ganguly et al.
S. Ganguly et al. entitled "Processing Data-Stream Join Aggregates Using Skimmed Sketches", published online in Feb. 2004, and as pp. 569-586 in "Lecture Notes in Computer Science", vol. 2992 / 2004, "Advances in Database Technology—EDBT 2004: 9th International Conference on Extending Database Technology, Heraklion, Crete, Greece, Mar. 14-18, 2004", edited by Elisa Bertino et al., published by Springer-Verlag, Heidelberg, Germany, 2004.

(Continued)

*Primary Examiner*—Cam-Linh Nguyen

(57) ABSTRACT

A method of estimating an aggregate of a join over data-streams in real-time using skimmed sketches, that only examines each data element once and has a worst case space requirement of $O(n^2/J)$, where J is the size of the join and n is the number of data elements. The skimmed sketch is an atomic sketch, formed as the inner product of the data-stream frequency vector and a random binary variable, from which the frequency values that exceed a predetermined threshold have been skimmed off and placed in a dense frequency vector. The join size is estimated as the sum of the sub-joins of skimmed sketches and dense frequency vectors. The atomic sketches may be arranged in a hash structure so that processing a data element only requires updating a single sketch per hash table. This keeps the per-element overhead logarithmic in the domain and stream sizes.

14 Claims, 5 Drawing Sheets

OTHER PUBLICATIONS

"Sketch-Based Multi-query Processing over Data Streams" by A. Dobra et al. in "Lecture Notes in Computer Science", vol. 2992 / 2004, "Advances in Database Technology—EDBT 2004: 9th International Conference on Extending Database Technology, Heraklion, Crete, Greece, Mar. 14-18, 2004", edited by Bertino et al., pp. 551-568, published by Springer-Verlag, Heidelberg 2004.

S. Ganguly et al. entitled "Processing Set Expressions over Continuous Update Streams" published in the "Proceedings of the 2003 ACM SIGMOD International Conference on Management of Data, San Diego, California, USA, Jun. 9-12, 2003", edited by A. Halevy et al. and published by Association for Computing Machinery (ACM), New York, NY 2003, ISBN 1-58113-634-X , pp. 265-276, (2003).

S. Ganguly et al, entitled "Tracking set-expression cardinalities over continuous update streams", published in The VLDB Journal: The International Journal on Very Large Databases, vol. 13, No. 4, Dec. 2004, pp. 354-369, published by Springer-Verlag, Heidelberg, 2004.

* cited by examiner

PROCESSING DATA-STREAM JOIN AGGREGATES USING SKIMMED SKETCHES

FIELD OF THE INVENTION

The present invention relates to methods of querying data-streams, and more particularly to methods of estimating SQL-like aggregate queries over join operations on one or more data-streams.

BACKGROUND OF THE INVENTION

Large volumes of data in the form of continuous data-streams are generated by a number of applications including telecommunication networks, retail chain transactions and banking automated teller machine (ATM) transactions.

In order to monitor these data-streams and detect patterns that may, for instance, indicate fraudulent use, equipment malfunction or non-optimal configuration, it is desirable to query these data-streams in real time using algorithms that only have access to each data element in the stream once and in the arbitrary order in which the data element appears in the data-stream. Because of the limitations of the computers doing the monitoring, it is also desirable that these algorithms use only a relatively small amount of memory. Moreover, the need for real-time answers means that the time for processing each element should also be small.

A particularly desirable form of monitoring is the ability to perform queries on these data-streams that are similar to the structured query language (SQL) queries performed on more traditional fixed data bases.

For instance, a telecommunications network operator might want to know how many subscribers in a particular area are experiencing incomplete calls. In a traditional relational database, this question would be answered by examining two tables, the first table relating subscribers to their location, and the second table relating subscribers to incomplete calls. In particular, a SQL join of the two tables would be preformed to create a new table relating the subscribers in a particular location to incomplete calls, i.e., a table of subscribers in that location who are experiencing incomplete calls. The required result is the number of subscribers in the new table, i.e., the required results is the size of the join.

The problem is how to provide a reasonably accurate approximate answer to such SQL-like queries over join operations, such as calculating the size of a join, when the data is arriving in a data-stream and each data element can only be examined once. Moreover, the estimated answer needs to be provided in real time using limited computer memory.

SUMMARY OF THE INVENTION

Briefly described, the invention provides a method of estimating the size, or other aggregate quantities, of a join over one or more data-streams in real-time. The method only examines each data element in the data-stream once, uses a limited amount of computer memory and is effective on large volumes of data.

The approximate size of the join between two data-streams may be obtained using sketches that are essentially pseudo-random projections of the data distributions for the streams involved. Sketches use random variables that are essentially vectors having a randomly chosen value of either +1 or −1 for each data-stream domain value, and in which the expected number of +1 elements is essentially equal to the expected number of −1 elements. An atomic sketch is the inner product of the data-stream frequency vector and this random binary variable vector. As long as the same random variable vector is used to create atomic sketches of two different data-streams, the size of a join between those data streams can be estimated as the product of the atomic sketches.

In order to obtain an estimate of a given degree of accuracy, this basic method uses several independent instantiations of this basic sketch estimate and has a worst case space requirement of $O(n^4/J^2)$, where J is the size of the join and n is the number of data elements.

In a preferred embodiment, this worst case space requirement is reduced to $O(n^2/J)$, by using a novel skimmed sketches method to obtain the approximate size of the join between two data-streams.

The skimmed sketch of the preferred embodiment is obtained by first skimming off the dense frequency values from the sketches of each data-stream, i.e., the frequency values that exceed a predetermined threshold. The skimmed off values are kept in a dense frequency vector. The overall join size is then estimated as the sum of the appropriate sub-joins of corresponding skimmed sketches and dense frequency vectors for the two streams.

In a further embodiment of the invention, the atomic sketches of each data stream are arranged in a hash structure so that processing a data element from the data-stream requires updating only a single sketch per hash table. This allows the per-element overhead to be kept logarithmic in the domain and stream sizes.

These and other features of the invention will be more fully understood by references to the following drawings.

DETAILED DESCRIPTION

Figure 1:
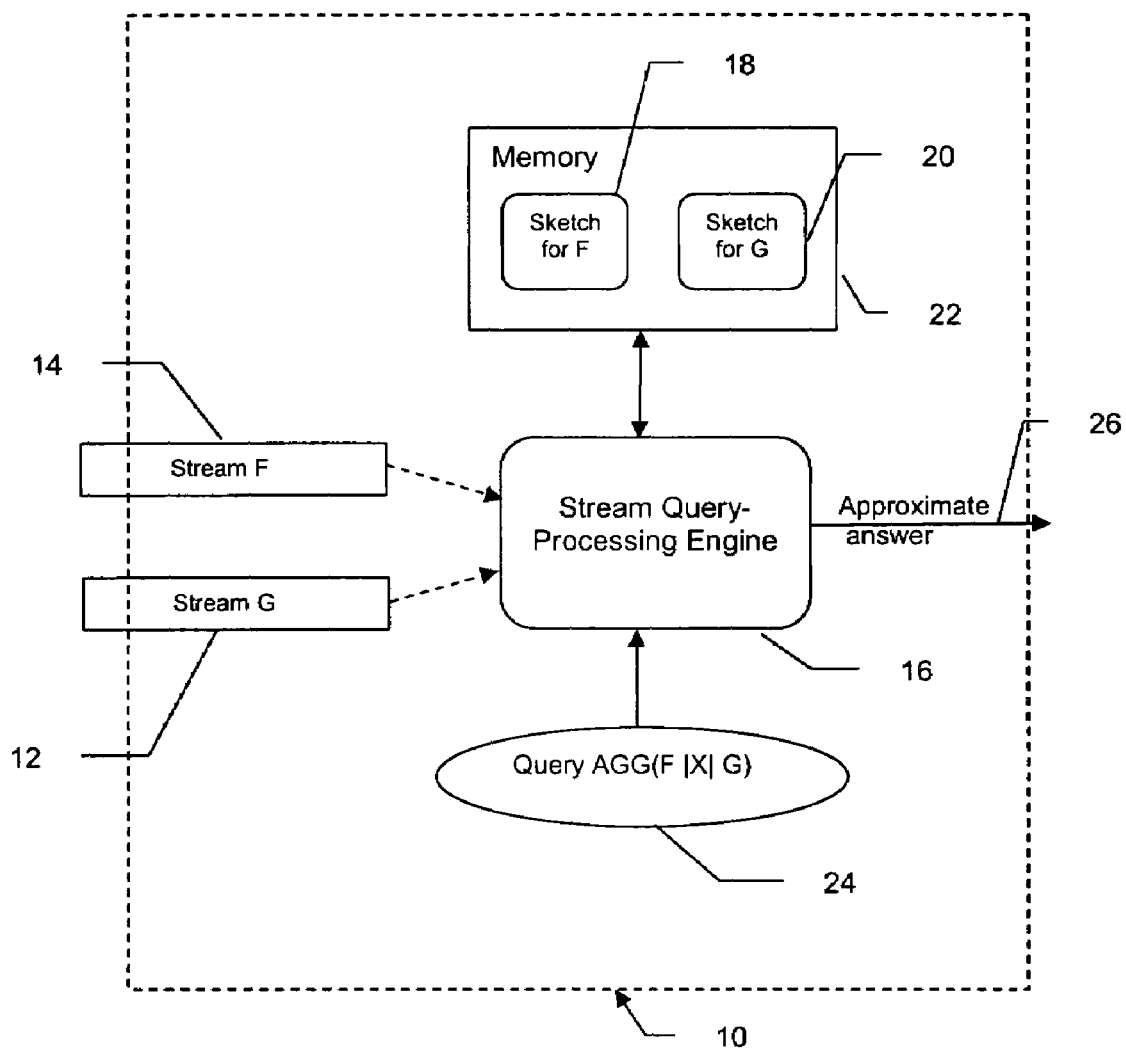
FIG. 1 is a schematic representation of a stream query-processing architecture.

The present invention provides a method of performing queries on data-streams that are similar to the more traditional structured query language (SQL) queries performed on fixed data bases. In particular, the present invention provides a method of estimating binary-join aggregate queries over one or more data-streams in real-time using a technique based on pseudo-random projections of the data distribution for the data-streams involved. The method uses a single pass algorithm that only examines each data element in the data-stream once, in the order the data arrives, to maintain a reasonably accurate synopsis of the data-stream that can be stored in a limited amount of computer memory and used to provide approximate answers with some guarantees on the error of the approximation.

The size of a join between two data streams F and G is given by the inner product of the frequency vectors $f_u$ and $g_u$ of the data-streams, i.e., $|F \bowtie G| = \Sigma f_u \cdot g_u$.

This inner product may be approximated using sketches of the streaming data, as described in more detail in, for instance, an article by S. Ganguly et al. entitled "Processing Data-Stream Join Aggregates Using Skimmed Sketches", published online in February 2004, and as pp. 569-586 in "Lecture Notes in Computer Science", Volume 2992/2004, "Advances in Database Technology—EDBT 2004: 9th International Conference on Extending Database Technology, Heraklion, Crete, Greece, Mar. 14-18, 2004", edited by Elisa Bertino et al., published by Springer-Verlag, Heidelberg, Germany, 2004, the entire contents of which are hereby incorporated by reference, and which hereafter is referred to as "Ganguly et al".

One method of creating sketches suitable for SQL-like queries is to first select a family of four-wise independent random binary variables $\xi$, that are essentially vectors having a randomly chosen value of either +1 or −1 for each data-stream domain value, and in which the expected number of +1 elements is essentially equal to the expected number of −1 elements, i.e., the probability of each binary element in the variable is essentially equal to ½. The atomic sketch $X_F$ of a data stream F is then given by the inner product of the data-stream frequency vector $f_u$ and the random binary variable $\xi$, i.e., the sum of the product of each domain frequency and the random binary variable's element associated with that frequency, i.e. $X_F = \Sigma_u f_u \xi_u$. Such an atomic sketch is essentially a random linear projection of the data-stream frequency distributions. Such a linear projection can be easily maintained over a stream by adding $\xi_u$ to $X_F$ when u is inserted in the data-stream (and subtracting when u is deleted).

As long as the same family of random variables is used to create atomic sketches of two different data-streams, the product of atomic sketches gives an atomic estimate of the join size because the value of |F|x|G| is given by the sum $\Sigma_u f_u \cdot g_u$ which is the expected value of $X_F X_G = (\Sigma_u f_u \xi_u)(\Sigma_u g_u \xi_u)$. This expectation occurs because, on average, the multiplication cross-product terms cancel each other.

A synopsis is the family of atomic sketches for a data-stream generated by using several independent families of random variables $\xi$. The final estimate of the join size may then be estimated as the median value of the join size estimates of the collection of individual atomic sketch estimates in the synopsis.

As shown in, for instance, Ganguly et al., in order to provide good guarantees for the accuracy of the estimate, this simple sketch estimate has worst case space requirement of $O(n^4/J^2)$, where J represents the size of the join and n represents the number of data elements. The minimum space requirement needed for an estimate that provides good guarantees for the accuracy of the estimate has, however, been shown to be $O(n^2/J)$. The skimmed sketch method of this invention is an algorithm in which the worst case space requirement is equal to this minimum possible requirement.

The skimmed sketch is obtained by first skimming the dense frequency values off the atomic sketch of the data-stream, i.e., the frequency values that exceed a predetermined threshold. The skimmed off values are kept in a dense frequency vector, and the residual values in the atomic sketch form the skimmed atomic sketch. The overall join size is then estimated as the sum of the sub-joins of skimmed sketches and dense frequency vectors.

In a further embodiment of the invention, the random sketches of the data stream are arranged in a hash structure so that processing a data element from the data-stream only requires updating a single sketch per hash table. This allows the per-element overhead to be kept logarithmic in the domain and stream sizes.

FIG. 1 is a schematic representation of a stream query-processing architecture 10 comprising two, continuous data-streams, G 12 and F 14, a stream query processing engine 16, a sketch 18 for data-steam F and a sketch 20 for data-stream G, both stored in computer memory 22, a query 24 and an approximate answer 26.

The data-streams G 12 and F 14 are both unordered sequences of elements with values from the domain D={1 ... m}. The element values may themselves be vectors or have vectors associated with them. These vectors may include values that indicate if the specified data elements are inserted or deleted from the stream. The skim-sketch method is capable of dealing with general update streams, i.e., data-streams having both insertion and deletion operations.

The query 24 may take the general form of an aggregate of a join of the two data-streams, i.e., Q=AGG(F|X|G), where AGG is any arbitrary aggregate operator such as, but not limited to, COUNT, SUM, or AVERAGE.

If $f_u$ and $g_u$ denote the frequencies of the domain value u in the streams F and G respectively, then the result of the join query COUNT((F|X|G) is $\Sigma_u f_u \cdot g_u$.

In contrast to conventional database management systems (DBMS), the stream query processing engine 16 only sees each element in streams F and G once and in the fixed order in which the elements happen to arrive. The order of element arrival in each stream is arbitrary, and elements with duplicate values can occur anywhere over the duration of the stream.

The computer memory 22 is small compared to the number of data elements in the data-streams and is used to maintain a concise and accurate synopsis of each data-stream, each synopsis comprising one or more sketches 18 for data-steam F and corresponding sketches 20 for data-stream G. The main constraints on each synopsis are (1) that it is much smaller than the total number of data elements (also known as "tuples") in the data stream, in particular that its size is logarithmic or poly-logarithmic with respect to the size of the data-stream, and (2) that the synopsis can be computed in a single pass over the tuples in the data-stream, in any, arbitrary order of their arrival. Furthermore, at any point in time, the query processing algorithms must be able to combine the maintained synopses to produce an approximate answer to the query.

TABLE 1

Procedure ESTJOINSIZE.

Procedure ESTJOINSIZE($X_F$, $X_G$, $s_1$, $s_2$)
Input: Sketches $X_F$ and $X_G$ for streams F and G (respectively).
Output: Estimate of binary-join size of F and G.
begin
1.    for i = 1 to $s_2$ do $Y_i := (\Sigma_{j=1}^{s_1} X_F[i,j] \cdot X_G[i,j])/s_1$;
2.    return median $\{Y_1, Y_2, ..., Y_{s_2}\}$;
end Table 1 shows the steps of join-size estimation using basic sketching in the procedure ESTJOINSIZE ($X_f$, $X_g$, $s_1$, $s_2$). The procedure takes as its input two arrays of atomic sketches $X_f$, $X_g$, each being an array of size $s_1$ by $s_2$. These arrays are sometimes called synopses. Specifically, the synopsis S(F) comprises a two-dimensional array of $s_1$ by $s_2$ atomic sketches, where $s_1$ is a parameter that determines the accuracy of the estimate and $s_2$ is a parameter that determines the confidence in the estimate. Each atomic sketch in the synopsis array X[i,j], $1 \leq i \leq s_1$, $1 \leq j \leq s_2$, is constructed in the same way as the atomic sketch $X_F$ of a data stream F, described earlier, but with an independent family of four-wise independent variables $\{\xi^{ij}_u : u=1, \ldots m\}$. Thus, atomic sketch $X_F[i,j] = \Sigma_u f_u \xi^{ij}_u$.

In line 1 of ESTJOINSIZE, $s_2$ estimates $Y_i$ of the join size between data-streams F and G are calculated averaged over $s_1$ atomic estimates $X_F[i,j] \cdot X_G[i,j]$.

In line 2 of ESTJOINSIZE, the median value Y of the $s_2$ $Y_i$ join size estimates is selected as the best estimate of the join size.

This can be shown to produce an estimate with a relative error of at most $\epsilon$ as long as $s_1$ is $O(\sqrt{(f^2 g^2/\epsilon)})$ with probability of at least $1-\delta$, as long as $s_2$ is $O(\log(m/\delta))$, where is the sum over all u of $f_u^2$, and is the sum over all u of $g_u^2$.

Unfortunately, this means that, in order to provide good guarantees for the accuracy of the estimate, the method of ESTJOINSIZE has a worst case size requirement of $O(n^4/J^2)$, where J is the size of the join and n is the number of data elements. The minimum space requirement needed for an estimate that provides good guarantees for the accuracy of the estimate has, however, been shown to be $O(n^2/J)$. (See, for instance, Ganguly et al.). Moreover, processing each element from the data-streams requires updating every one of the $s_1$ by $s_2$ atomic sketches, which is highly undesirable when dealing with rapid rate streams.

Figure 2:
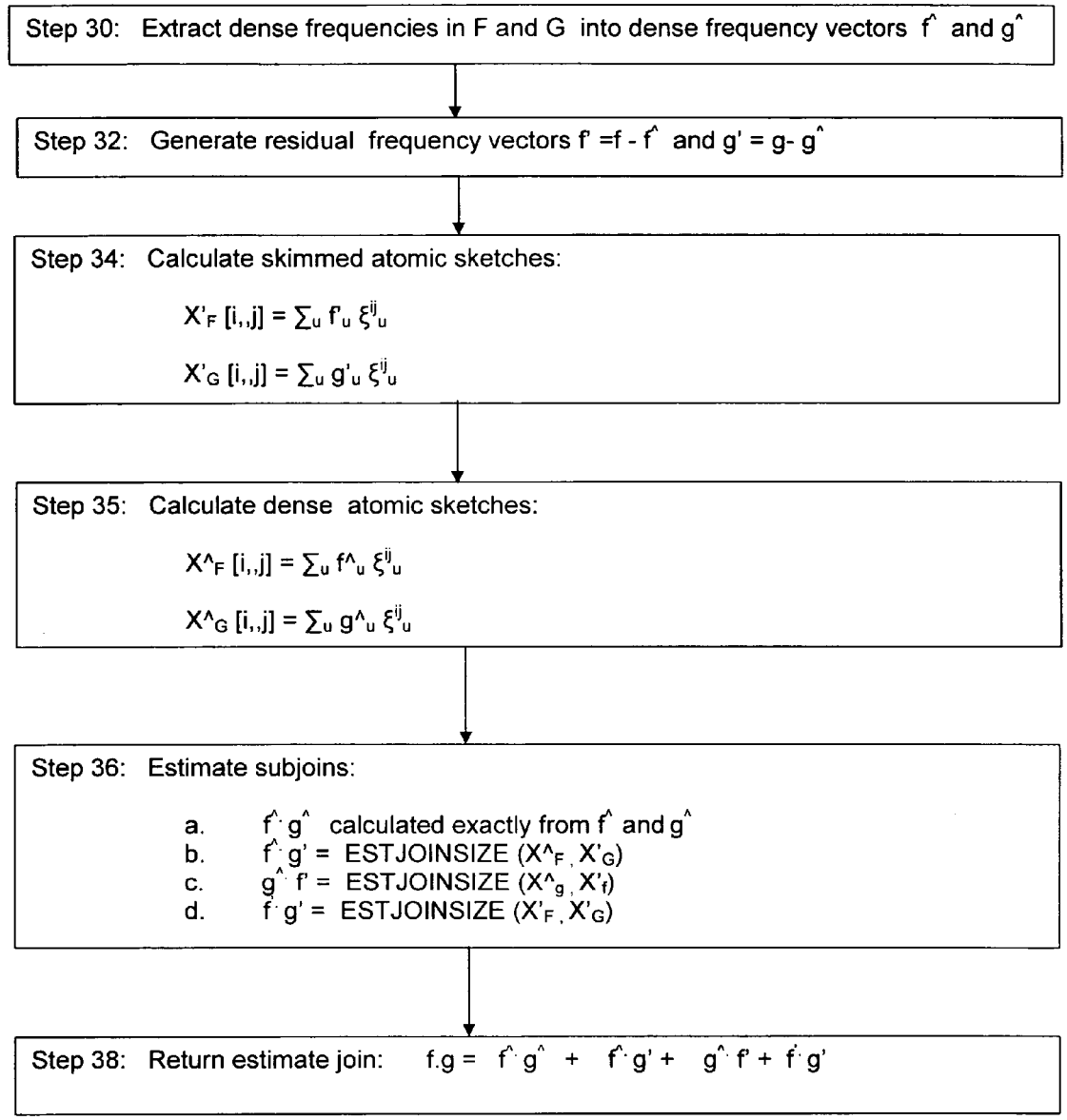
FIG. 2 is a flow diagram showing the steps of join-size estimation using skimmed sketches.

FIG. 2 is a flow diagram showing the steps of join-size estimation using skimmed sketches, which is a method that has a worst case space requirement that matches the lower bound of $O(n^2/J)$.

In step 30, atomic sketches $X_F$ and $X_G$ are created and maintained as the data elements u arrive in each data-stream. For instance, atomic sketch $X_F$ is maintained by adding $\xi_u$ to $X_F$ when u is inserted in the data-stream F (and subtracting when u is deleted from data-stream F).

In step 32, at estimation time, the dense frequencies in F and G are extracted from atomic sketches $X_F$ and $X_G$ and transferred to dense frequency vectors f^ and g^ respectively. A domain value u is considered dense if its frequency $f_u$ (or $g_u$) is equal to or exceeds a pre-determined threshold value T. Atomic skimmed sketch $X'_F$ and $X'_G$ are the residual elements in the atomic sketches after the dense frequencies have been skimmed off, i.e., all the values are less then the predetermined threshold value T.

In step 34, two synopsis arrays of atomic dense sketches $X^\wedge_F$ and $X^\wedge_G$ are created using the dense frequency vectors and an independent family of four-wise independent variables $\{\xi^{ij}_u : u=1, \ldots m\}$. Thus, atomic dense sketch $X^\wedge_F[i,j] = \Sigma_u f^\wedge_u \xi^{ij}_u$ and atomic dense sketch $X^\wedge_G[i,j] = \Sigma_u g^\wedge_u \xi^{ij}_u$.

In step 36, the four possible subjoins f^.g^, f^.g', f'.g^ and g'.f' are estimated. The dense subjoin f^.g^ is calculated exactly, that is with zero error, which is possible because the dense frequency vectors are known exactly. The other three subjoins are calculated using the appropriate arrays of the atomic sketches and the method of the procedure ESTJOINSIZE, as described above.

In step 38, the estimate of the join size is computed to be the sum of the estimates of the subjoins.

As shown in, for instance, Ganguly et al., all the frequencies greater than $T=O(n/s_1)$ can be extracted with high reliability from the sketches of the data-streams. As a result, in the worst case, $f'_2$ and $g'_2$ can be at most $n.T = O(n^2/s_1)$ (which happens when there are n/T values with frequency T). Thus, in the worst case, the maximum additive error in the estimate computed by skimming dense frequencies is $O\sqrt{n^2 \cdot (n^2/s_1)/s_1)} = O(n^2/s_1)$. It follows that for a desired level of accuracy $\epsilon$, the space $s_1$ required in the worst case, becomes $O(n^2$ ($\epsilon$.

(f.g))), which is the square root of the space required by the basic sketching technique, and matches the lower bound achievable by any join size estimation algorithm.

Figure 3:
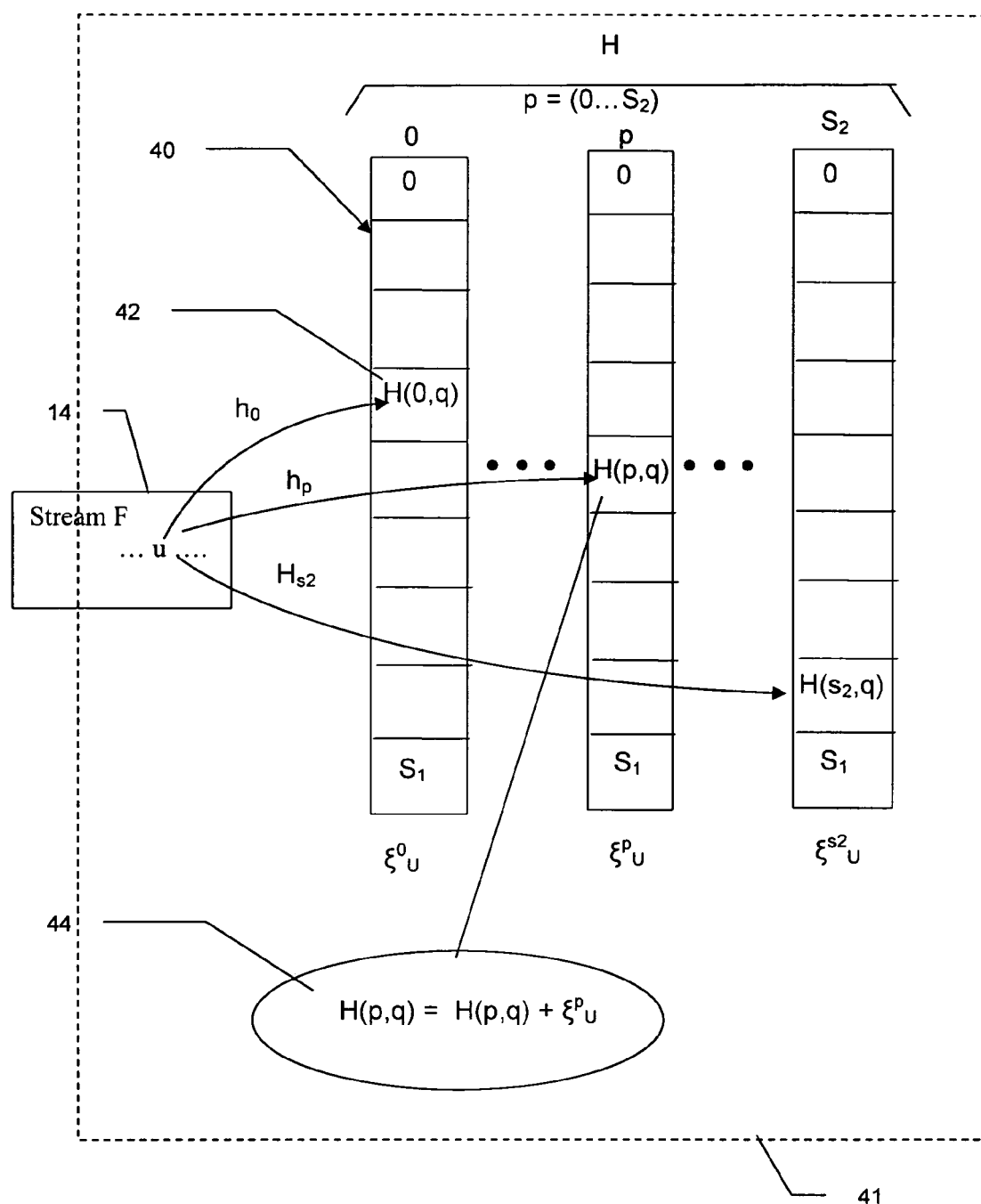
FIG. 3 is a schematic representation of a hash sketch data structure in which each counter is essentially an atomic sketch constructed over the stream elements that map to that bucket.

FIG. 3 shows a hash data structure 41 that allows the skimmed sketch estimation technique detailed above to be implemented effectively in a streaming data environment. Hash data structure 41 comprises an array H of $s_2$ hash tables 40. Each of the p hash tables 40 has $s_1$ hash buckets 42. Each hash bucket 42 contains a single counter for elements that hash into that bucket. The array H can be viewed as a two-dimensional array of counters, with H[p,q] representing the counter in bucket q of hash table p. Associated with each of the p hash tables 40 is a pair-wise independent hash function $h_p$ that maps incoming data elements in the data-stream over the range of buckets in the hash table 40, i.e., $h_p : \{1, \ldots, m\} \to \{1, \ldots, s_1\}$. For each hash table p there is also an associated family of binary variables $\xi^p_u$, such that $\{\xi^p_u : u = 1, \ldots m\}$.

Initially, all counters H[p,q] are set to zero. Each data element u in stream F 14, is first hashed to a hash bucket 42 using the family of hash function $h_p$, i.e., $q = h_p(u)$. The counter H[p,q] in each destination hash bucket 42 is updated using the function 44, i.e., $H[p,q] = H[p,q] + \xi^p_u$. Each counter H[p,q] is, therefore, essentially an atomic sketch constructed over the stream elements that hash to the q th hash bucket 41 of the p th hash table 40.

If the data element specifies that value u has been deleted from the data-stream 14, $\xi^p_u$ is simply subtracted. As there are $s_2$ hash tables, the time to process each data element is essentially the time to update a single counter in each hash table, i.e. $O(s_2)$. As the join size can be estimated with a strong probabilistic error guarantee as long as $s_2 = O(\log m)$, maintaining the hash sketch data structure 41 for a data-stream 14 only requires logarithmic time per stream element.

By randomly distributing domain values across the $s_1$ hash buckets 40, the hash functions $h_p$ help separate the dense domain values. The self-join sizes within each hash bucket are much smaller, allowing the dense domain values to be fairly accurately (and with constant probability) calculated by computing the product $H[p,q] \cdot \xi^p_u$. The total join size estimate u is then the sum of the join sizes from the individual hash buckets. The probability of the estimate being accurate to be within a giving error can be boosted to $1-\delta$, by selecting the median estimate of the $s_2 = O(\log(m/\delta))$ different frequency estimates for u obtained from each of the hash tables 40.

TABLE 2

Procedure SKIMDENSE

Procedure SKIMDENSE(H)
Input: Hash sketch H for stream F.
Output: Skimmed sketch and frequency estimates f for dense values.
begin
1.   for every domain value u ∈ D do $f_u := 0$;
2.   E := φ; T' := Θ(n/$s_1$);
3.   for every domain value u ∈ D do {
4.       for each hash table p do { q := $h_p$(u); $f_u^p$ := H[p, q] · $\xi_u^p$; }
5.       EST(u) := median{$f_u^1, \ldots, f_u^{s_2}$};
6.       if (EST(u) ≥ 2T') then { $f_u$ := EST(u); E := E ∪ {u}; }
7.   }
8.   for every domain value u such that $f_u$ > 0 do
9.       for each hash table p do { q := $h_p$(u); H[p, q] := H[p, q] − ($f_u \cdot \xi_u^p$); }
10.  return (H, f, E);
end Table 2 shows the steps of procedure SKIMDENSE which uses this method to extract all the dense domain values u of a data-stream F into a dense frequency vector f̂.

Procedure SKIMDENSE takes a hash structure 41 as the input.

In line 1 of SKIMDENSE, the procedure sets all dense vectors f̂ to zero.

In line 2 of SKIMDENSE, the threshold is set to be of the order of the number of data elements seen, divided by the number of hash bins 42 in the hash tables 40.

In lines 3 to 7 of SKIMDENSE, the procedure loops through all the domain values u. For each domain value u, the procedure, in line 4, goes through each of the p hash tables 40, finds the qth hash bin 42 to which the element u hashes, and then obtains an estimate of u's frequency $f^p{}_u$ as the product of the counter H[p,q] stored in the hash bin 42 and the random binary variable value $\xi^p{}_u$ for u, i.e., $f^p{}_u = H[p,q] \cdot \xi^p{}_u$.

In line 5 of SKIMDENSE, the final estimate of the frequency of u is taken as the median of the estimates of each of the $s_2$ hash-tables 40.

In line 6 of SKIMDENSE, the estimated values are compared with the threshold value T'. If they are sufficiently greater than the threshold value, they are determined to be a dense value, and the estimated value is stored as the dense domain value, and the domain value u is added to the vector E of dense domain values. Between them, E and $f̂{}_u$ constitute the vector of dense domain frequencies.

In lines 8 and 9 of SKIMDENSE, for each domain value u that has been determined to be dense, the hash buckets 42 of all p hash tables 40 to which domain u hashes, are adjusted by subtracting off the contribution of the dense domain value to the corresponding sketch.

In line 10 of SKIMDENSE, the dense domain values, the set of dense domain values and the skimmed hash sketch structure are returned as the output of the procedure. The analysis of this procedure, as detailed in, for instance, Ganguly et al., shows that the procedure will extract all dense frequencies with high probability.

The simple SKIMDENSE procedure has a runtime complexity of O(m) as it examines every domain value u. This is a problem if domain sizes are large, as they are, for instance, with 64-bit IP addresses. This runtime complexity can, however, be reduced to be of $O(s_1 \cdot \log m)$ by using the concept of dyadic intervals, as illustrated in FIG. 4.

Figure 4:
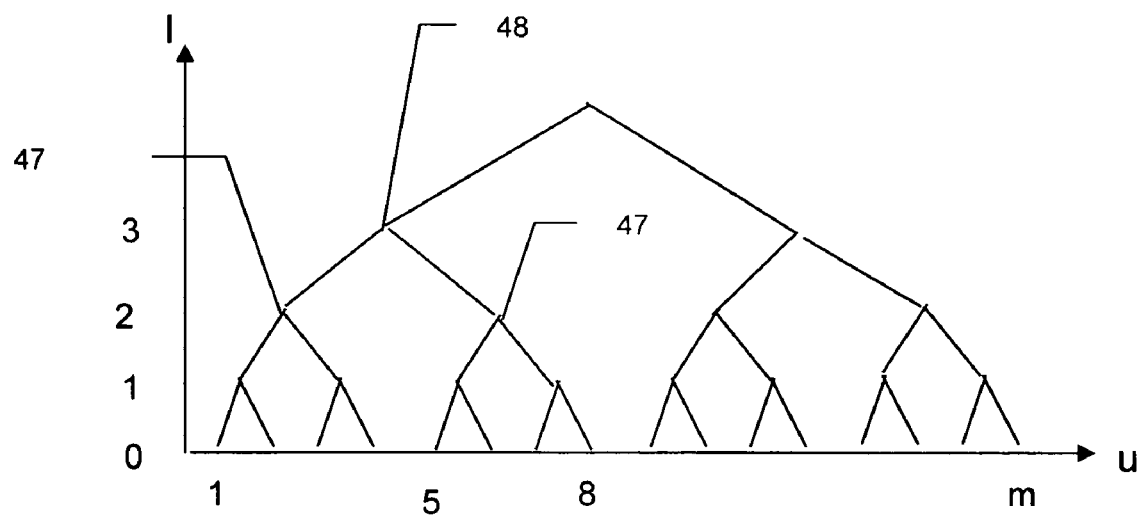
FIG. 4 is a schematic representation of the use of dyadic intervals to reduce the executing time of a hash based dense frequency skimming algorithm.

FIG. 4 illustrates an hierarchical tree of values in which the value at a given level is the sum of the two values in the next level down. From this illustration of a data tree, it can be seen that if a high level value is less than the required threshold, then none of the values in the tree below that point can exceed the threshold and the tree does not have to be examined further. Node values in such a tree correspond to the total frequencies of the corresponding intervals in the dyadic tree.

An optimized SKIMDENSE procedure maintains sketches 41 at log (m) levels. The SKIMDENSE routine then starts at the top of the hierarchical tree and estimates the dense frequency values at each level, and uses this to prune which branches of the tree it will examine at the next lower level, until level l=0 is reached. Specifically, if for a value u at level l>0, the estimated frequency at a given node is less than the required threshold, the entire sub-tree beneath that node does not need to be examined. For instance if the estimate of u at node 48 is less than or equal to the required threshold, then nodes 47 do not need to be examined, and all values of u from 1-8 at level l=0 are known to be not dense.

At each level l there can be at most O(n/T') values with frequency T' or higher, the worst-case complexity of this optimized SKIMDENSE algorithm is $O(s_1 \cdot \log(m))$.

Tables 3 and 4 show procedures used to estimate the join size of two data streams.

TABLE 3

Procedure ESTSUBJOINSIZE

Procedure ESTSUBJOINSIZE(v̂, H')
Input: Frequency vector v̂ of dense frequencies and hash sketch H'.
Output: Estimate of subjoin size.
begin
1.     for p = 1 to $s_2$ do {
2.         $J^p$ := 0;
3.         for each domain value u s.t. $v̂_u > 0$ do { q := $h_p(u); J^p := J^p + H'[p, q] \cdot (v̂_u \cdot \xi_u^p);$ }
4.     }
5.     return median{$J^1, \ldots, J^{s^2}$};
end Table 3 shows the steps of procedure ESTSUBJOINSIZE, which estimates the subjoin size between a given dense frequency vector and a given skimmed hash structure 41. In lines 1 to 4 of ESTSUBJOINSIZE, a join estimate $J^p$ is calculated for each of the $s_2$ hash tables 40. In line 5, the median value of the s2 estimated values of the join size is returned as the best estimate of the join.

TABLE 4

Procedure ESTSKIMJOINSIZE

Procedure ESTSKIMJOINSIZE($H_F$, $H_G$)
Input: $H_F$ and $H_G$ are the hash sketches for streams F and G.
Output: Estimate of join size.
begin
1.     ($H'_F$, f̂, $E_F$) := SKIMDENSE($H_F$); ($H'_G$, ĝ, $E_G$) := SKIMDENSE($H_G$);
2.     $J_{d,d}$ := f̂ · ĝ; $J_{ds}$ := ESTSUBJOINSIZE(f̂, $H'_G$); $J_{sd}$ := ESTSUBJOINSIZE(ĝ, $H'_F$);
3.     for p = 1 to $s_2$ do {
4.         $J_{ss}^p$ := 0;
5.         for q = 1 to $s_1$ do $J_{ss}^p := J_{ss}^p + H'_F[p, q] \cdot H'_G[p, q];$
6.     }
7.     $J_{ss}$ := median {$J_{ss}^1, \ldots, J_{ss}^{s^2}$};
8.     J := $J_{dd} + J_{ds} + J_{sd} + J_{ss}$;
9.     return J;
end Table 4 shows the steps of procedure ESTSKIMJOINSIZE, which takes two hash structures 41 as the input, one for a data-stream F and one for a data-stream G, and returns an estimate of the join size. Procedure ESTSKIMJOINSIZE uses procedures ESTSUBJOINSIZE and SKIMDENSE in making the estimation.

In line 1 of ESTSKIMJOINSIZE, the procedure SKIMDENSE is used to create skimmed hash structures 41 and the values and members of a dense frequency vector for both data-streams F and G.

In line 2 of ESTSKIMJOINSIZE, three sub-joins are calculated. The dense-dense subjoin is calculated exactly as the vector inner product of the dense frequency vectors estimated in step 1. The two sparse-dense subjoins are both calculated using the ESTSUBJOINSIZE procedure.

In lines 3 to 6 of ESTSKIMJOINSIZE, the sparse-sparse subjoin is estimated for each of the $s_2$ hash tables 40, essentially as the sum of the sub-joins of each of the corresponding hash bins 42 in the skimmed hash structures for data-streams F and G.

In line 7 of ESTSKIMJOINSIZE, the best estimate of the sparse-sparse subjoin is boosted by taking it to be the median of the $s_2$ join estimates obtained in lines 3-6.

In line 8 of of ESTSKIMJOINSIZE, the total join size for data-streams F and G is calculated as the sum of the four subjoins, i.e., the sum of the dense-dense, dense-sparse, sparse-dense and sparse-sparse subjoins.

Each of the sub-join errors is $O((n^2/s_1)(\log n)^{1/2})$. This is a result of the errors depending on the hash bucket self-join sizes. Since each residual frequency value in the skimmed hash structures 41 is at most $T=O(n/s_1)$, each bucket self-join size is proportional to $O(n^2/s_1^2)$, with high probability.

In the worst-case, the skimmed sketch algorithm requires approximately $O(n^2/(\epsilon.(f.g))$ amount of space, which is equal to the lower bound achievable by any join size estimation algorithm. Also, since the maintenance of the hash sketch data structure involves updating $s_2$ hash bucket counters per stream element, the processing time per element of our skimmed-sketch algorithm is $O(\log(m/\delta))$.

Figure 5A:
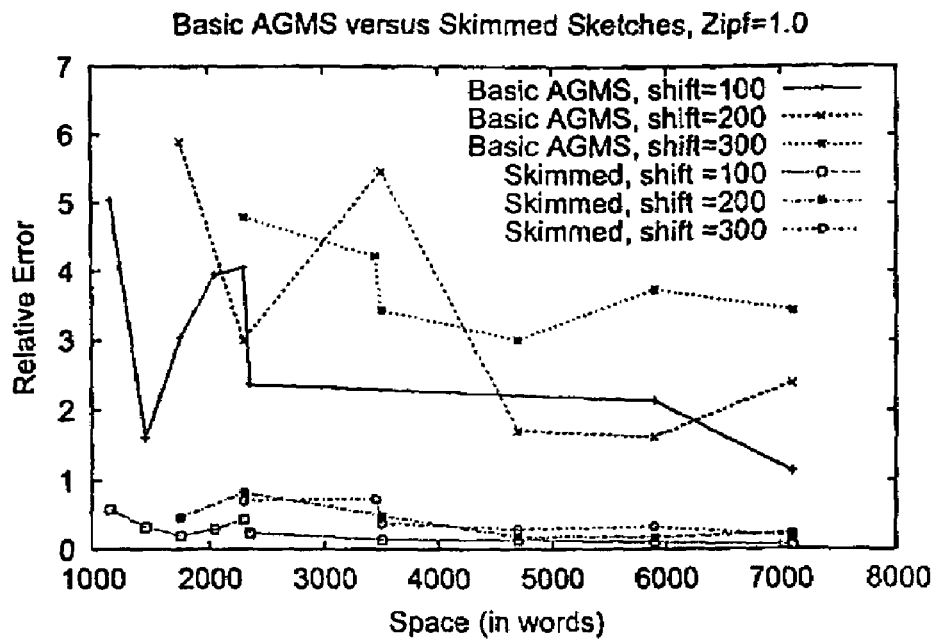
FIGS. 5 A & B show experimental results comparing basic sketch and skimmed sketch relative errors in estimating join-size.
Figure 5B:
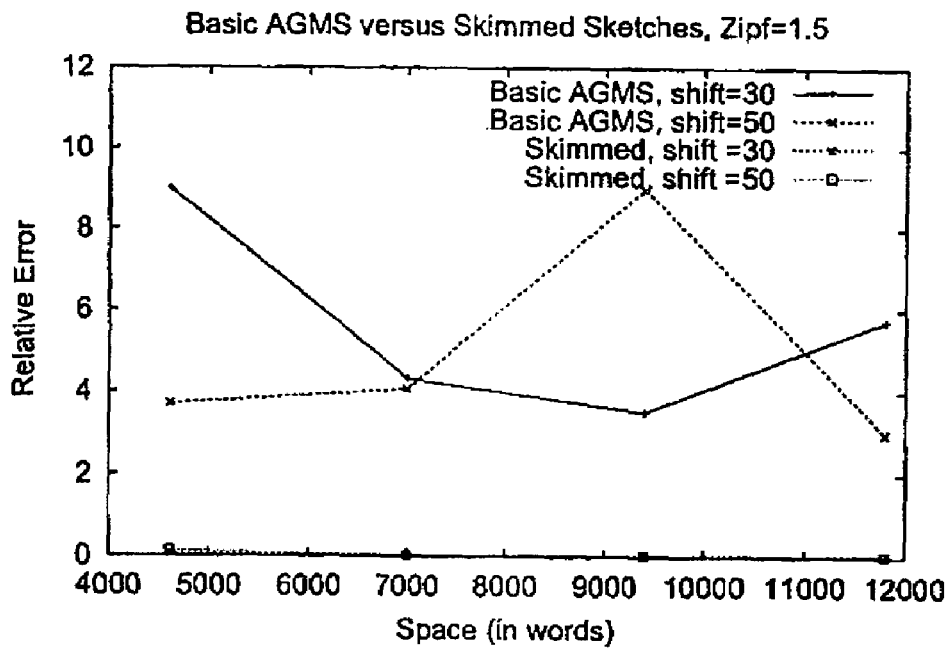

FIGS. 5 A and B show experimental results of using the skimmed-sketch algorithm to determine join sizes for two data streams. The error in the join size estimates obtained using the ESTSKIMJOINSIZE is compared to the error obtained using the basic sketching method of procedure EST-JOINSIZE (also called the AGMS or the Alon, Gibbons, Matias, Szegedy method).

The experiments used synthetic data sets having four million data elements for each data-stream, that evaluate the size of the join between a Zipfian distribution and a right-shifted Zipfian distribution, shifted by shift parameter s and having the same Zipf parameter z. The shift parameter s controls the join size, with s=0 being essentially a self-join and with the join size decreasing with increased s. The results demonstrate that the skimmed-sketch technique of this invention offer roughly half the relative error of basic sketch method. Similar results, not shown, have been obtained for real census bureau data, as detailed in Ganguly et al.

The above-described steps can be implemented using standard well-known programming techniques. Software programming code which embodies the present invention is typically stored in permanent memory of some type, such as permanent storage of a workstation located at Bell Labs of Lucent Technologies in Murry Hill, N.J. In a client/server environment, such software programming code may be stored in memory associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of estimating a join aggregate over one or more data-streams, the method comprising the steps of:

maintaining one or more atomic sketches over said one or more data-steams;

skimming dense frequencies from said atomic sketches, thereby creating a dense frequency vector and an atomic skimmed-sketch for each of said one or more data-streams, and;

generating an atomic estimate of said join aggregate using said atomic skimmed-sketches and said dense frequency vectors and storing said atomic estimate in a computer memory as an approximation of a size of said join aggregate.

2. The method of claim 1 wherein said step of maintaining one or more atomic sketches comprises the steps of:

obtaining a data element having a value from said one or two data-streams;

forming a product of said value and a randomly chosen binary variable; and incrementing said atomic sketch by said product.

3. The method of claim 2 wherein said step of generating an atomic estimate of said join aggregate comprises the step of summing the sub-joins of said atomic skimmed-sketches and said dense frequency vector.

4. The method of claim 3 wherein said data elements include one or more deletion operations; and wherein said step of maintaining one or more atomic sketches comprises the step of decrementing said atomic sketch by said product.

5. The method of claim 3 wherein said step of summing the sub-joins of said skimmed atomic sketches and said dense frequency vector comprises the steps of: forming an atomic dense sketch using said dense frequency vector and a family of said randomly chosen binary variables; calculating an exact dense-dense subjoin using said dense frequency vectors; calculating a dense-sparse and sparse-dense join using said atomic dense sketches and said atomic skimmed sketches; calculating a sparse-sparse subjoin using said atomic skimmed-sketches; and summing said dense-dense subjoin, said dense-sparse subjoin, said sparse-dense subjoin and said sparse-sparse subjoin.

6. The method of claim 3 wherein said step of maintaining one or more atomic sketches comprises the step of hashing a data element to a hash-table.

7. The method of claim 6 wherein said step of maintaining one or more atomic sketches comprises the steps of creating a counter for each hash bucket of said hash table, said counter comprising said atomic sketch for said data elements that hash to said hash bucket.

8. The method of claim 7 further comprising the steps of selecting one or more independent families of said randomly chosen binary variables that are four-wise independent; creating an array of said hash tables using said independent families of binary variables; and generating an estimate of said join aggregate further comprises selecting the median join aggregate of said atomic estimate of join aggregate made using each of said hash tables.

9. The method of claim 8 wherein said creating a dense frequency vector for each of said one or two data-streams further comprises selecting a median value of estimates of a domain frequency made using one of said counters from each of said array of hash tables.

10. The method of claim 9 wherein said calculating a sparse-sparse subjoin comprises selecting a median value of estimates made using the sum of hash bin subjoins for each of said hash tables.

11. The method of claim 2 wherein said randomly chosen binary variable is one element value of a vector having an element value for each domain value of the data stream, and wherein substantially half of said element values are +1 and substantially half of said element values are −1.

12. The method of claim 1 wherein said step of skimming dense frequencies from said atomic sketches comprises the step of extracting all frequencies of said data streams having a value greater than or equal to a threshold value.

13. A computer-readable medium for estimating a join aggregate over one or more data-streams, comprising instructions for:
    maintaining one or more atomic sketches over said one or more data-steams;
    skimming dense frequencies from said atomic sketches, thereby creating a dense frequency vector and an atomic skimmed-sketch for each of said one or more data-streams, and;
    generating an atomic estimate of said join aggregate using said atomic skimmed-sketches and said dense frequency vectors and storing said atomic estimate in a computer memory as an approximation of a size of said join aggregate.

14. A computing device for estimating a join aggregate over one or more data-streams, comprising:
    a computer-readable medium comprising instructions for:
        maintaining an array of parallel hash tables wherein each hash bucket is an atomic sketch of data-elements from said one or more data-streams;
        generating an array of hash table join estimates by summing the individual joins of said hash bucket across pairs of said parallel hash tables;
        selecting said estimate of a join aggregate as the median value of said array of hash table join estimates and storing said estimate on said computer device as an approximation of a size of said join aggregate.

* * * * *